March 23, 1965   H. NERWIN   3,175,222
FILM CASSETTE

Filed Jan. 10, 1963   5 Sheets-Sheet 1

FIG. I

HUBERT NERWIN
INVENTOR.

BY R. Frank Smith
Robert W. Hampton
ATTORNEYS

March 23, 1965  H. NERWIN  3,175,222
FILM CASSETTE

Filed Jan. 10, 1963  5 Sheets-Sheet 2

HUBERT NERWIN
INVENTOR.

BY R. Frank Smith
Robert W. Hampton
ATTORNEYS

March 23, 1965     H. NERWIN     3,175,222
FILM CASSETTE

Filed Jan. 10, 1963     5 Sheets—Sheet 3

HUBERT NERWIN
*INVENTOR.*

BY R. Frank Smith
Robert W. Hampton
ATTORNEYS

March 23, 1965 H. NERWIN 3,175,222
FILM CASSETTE
Filed Jan. 10, 1963 5 Sheets-Sheet 4

HUBERT NERWIN
INVENTOR.

BY R. Frank Smith
Robert W. Hampton
ATTORNEYS

March 23, 1965     H. NERWIN     3,175,222
FILM CASSETTE

Filed Jan. 10, 1963     5 Sheets-Sheet 5

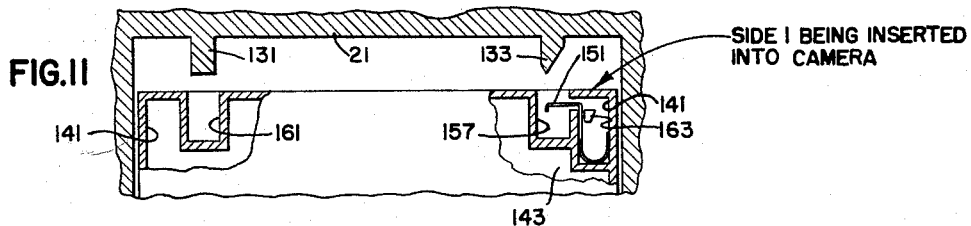
FIG.11 — SIDE 1 BEING INSERTED INTO CAMERA

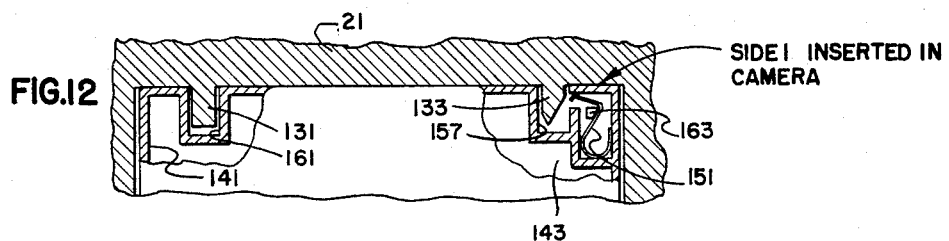
FIG.12 — SIDE 1 INSERTED IN CAMERA

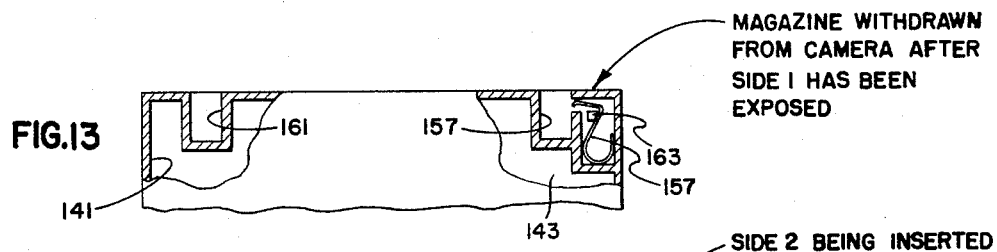
FIG.13 — MAGAZINE WITHDRAWN FROM CAMERA AFTER SIDE 1 HAS BEEN EXPOSED

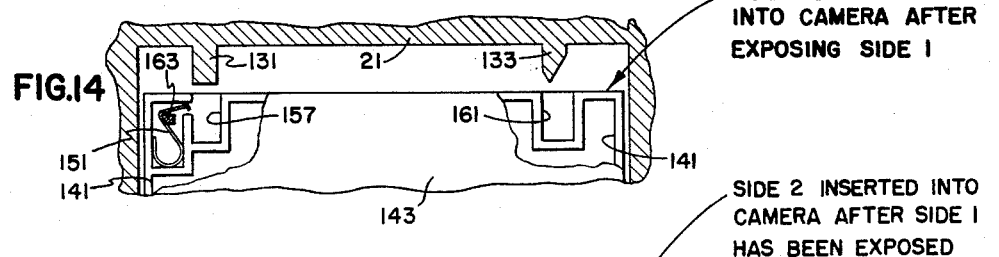
FIG.14 — SIDE 2 BEING INSERTED INTO CAMERA AFTER EXPOSING SIDE 1

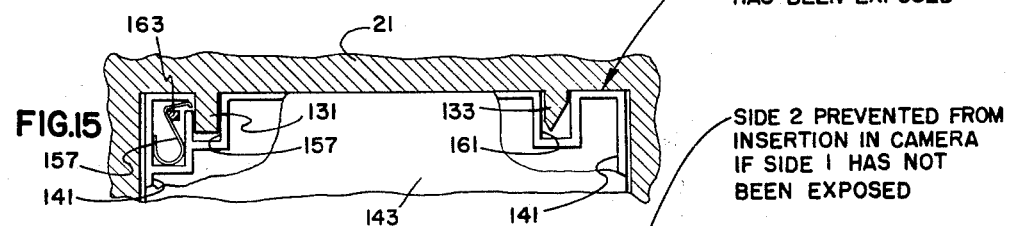
FIG.15 — SIDE 2 INSERTED INTO CAMERA AFTER SIDE 1 HAS BEEN EXPOSED

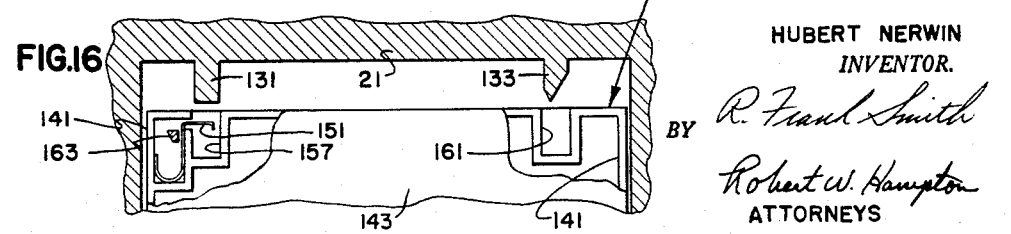
FIG.16 — SIDE 2 PREVENTED FROM INSERTION IN CAMERA IF SIDE 1 HAS NOT BEEN EXPOSED

HUBERT NERWIN
INVENTOR.

BY R. Frank Smith
Robert W. Hampton
ATTORNEYS

United States Patent Office 3,175,222
Patented Mar. 23, 1965

3,175,222
FILM CASSETTE
Hubert Nerwin, Rochester, N.Y., assignor to Eastman Kodak Company, Rochester, N.Y., a corporation of New Jersey
Filed Jan. 10, 1963, Ser. No. 250,560
10 Claims. (Cl. 352—72)

This invention relates to film-holding cassettes and magazines, and more particularly to improved movie camera cassettes which are designed to be inserted into cameras alternatively in a first and second position.

Movie camera operation has been greatly simplified for the amateur photographer by the introduction of the film-holding cassette into which the operator may easily load a spool of unexposed film, the cassette then being simply inserted into the camera in a first position for picture taking. During exposure, the film is wound off the supply spool onto a take-up spindle. When a predetermined amount of film has been exposed, the operator removes the cassette and then reinserts it into the camera in an inverted or rewind position, the camera again being operated to rewind the film onto its supply spool. With the popular 8 mm. movie cameras which utilize 16 mm. film, during this rewind operation the second half-width of the film is also exposed. Once the film has been rewound onto its supply spool, the operator opens the cassette and removes the exposed film for processing.

While cassette operation is quite simple, it is not "foolproof," and in the event that the operator fails to heed the "This Side Up For First Exposure" instructions which appear on the cassette and inadvertently inserts the cassette initially in its inverted (rewind) position, the film leader will be immediately rewound upon the supply spool when the operator begins to take pictures. If the operator fails to note this error, many desired frames may be "taken" without any film being exposed. In any event, the operator must remove the cassette, rethread the film leader and reinsert the cassette properly before the film can be exposed.

The invention herein prevents such inadvertent improper initial insertion of the cassette. The camera body is provided with two protruding lugs which are designed to cooperate with two suitable cavities in the cassette. One cavity is normally covered by a blocking member which, if the cassette is initially inserted properly, is engaged by one of said protruding lugs and moved out of its blocking relation to the cavity and locked in this withdrawn position until reset by the opening of the cassette cover. When withdrawn in this manner, the blocking member permits insertion of the cassette in its inverted position. However, in the event the operator attempts to insert the cassette initially in this inverted position, the blocking member is not moved to its withdrawn position and remains in covering relation to its cavity, preventing improper insertion of the cassette.

Therefore, it is an object of this invention to provide a new and improved film cassette for movie cameras.

It is another object of this invention to provide a means for preventing the inadvertent improper insertion of the cassette into the camera.

It is a further object to provide a cassette including simple and economical interlocking means for preventing any initial improper insertion of the cassette into the camera.

Other objects, purposes and characteristic features of the present invention will be in part obvious from the accompanying drawings, and in part pointed out as the description of the invention progresses. In describing the invention in detail reference will be made to the accompanying drawings in which like reference characters designate corresponding parts throughout the several views and in which.

Figure 1:
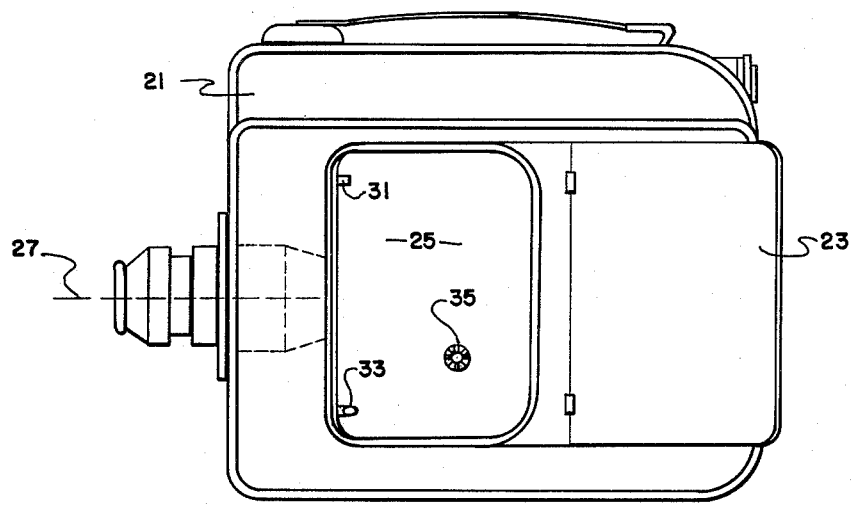
FIG. 1 is an elevational view of a camera designed to receive the cassette disclosed herein, illustrating the camera with its cassette-receiving recess open and omitting parts not pertinent to the disclosure herein.
Figure 3:
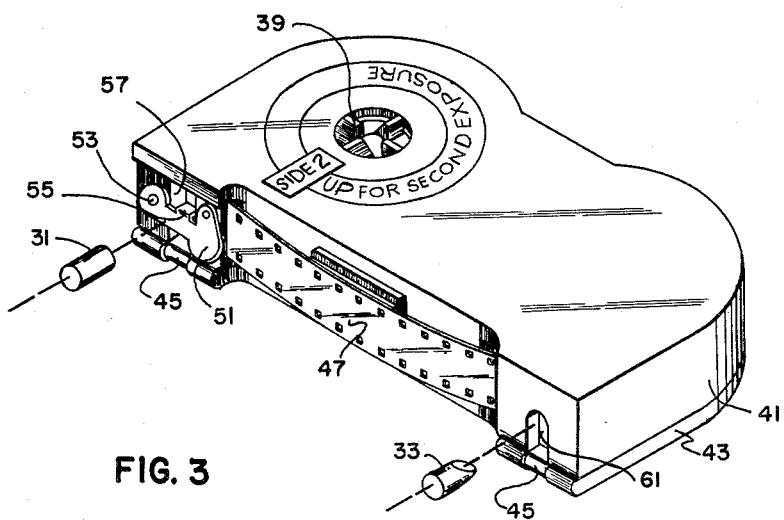
Figure 4:
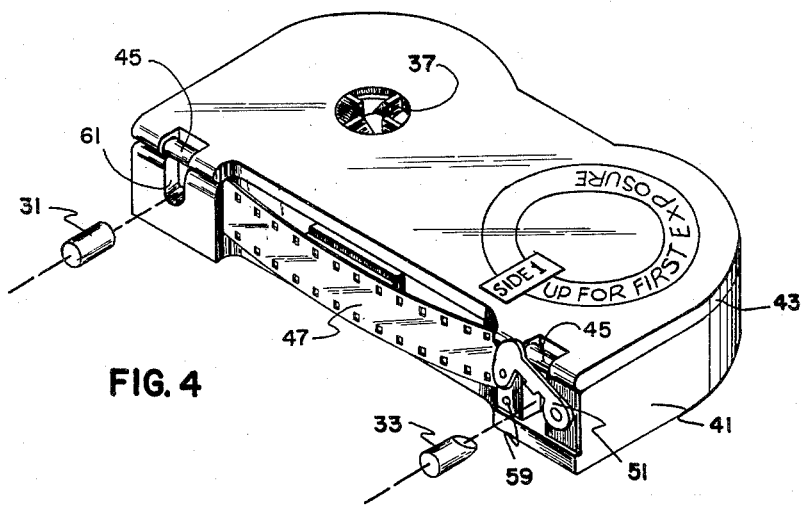
Figure 5:
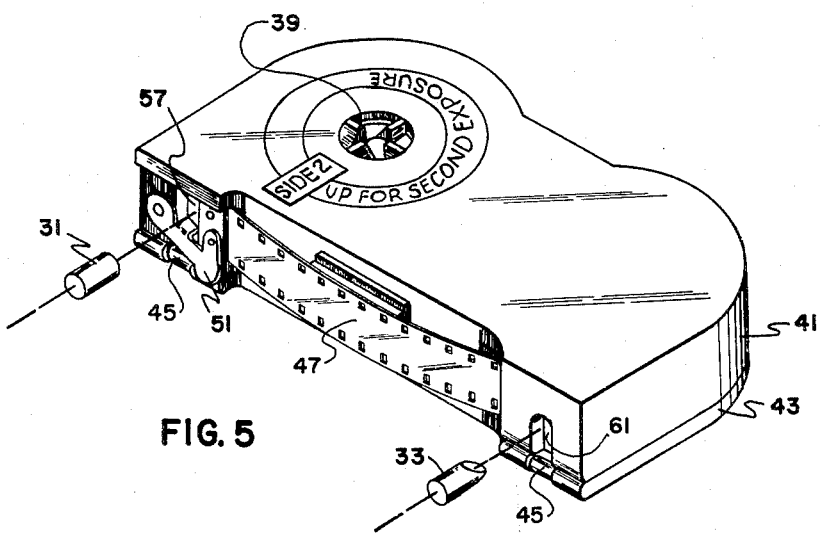
Figure 6:
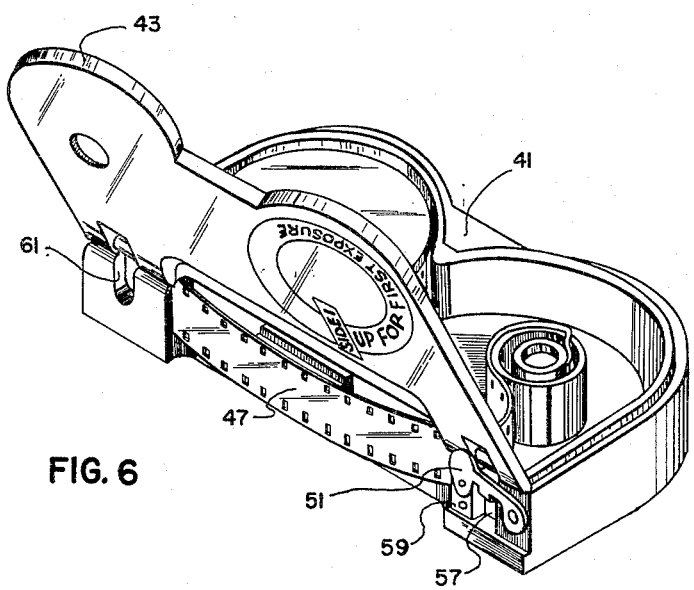
Figure 7:
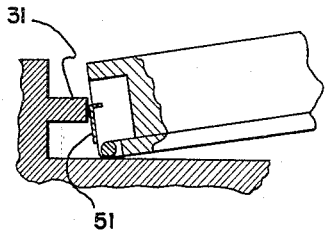
Figure 8:
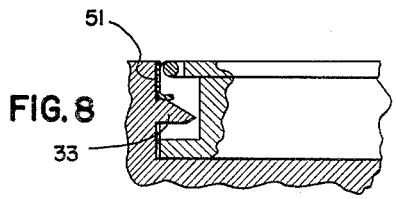
Figure 9:
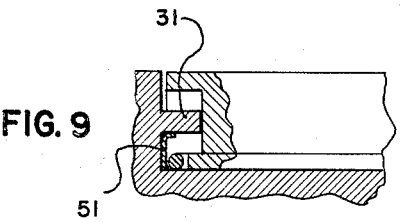
Figure 10:
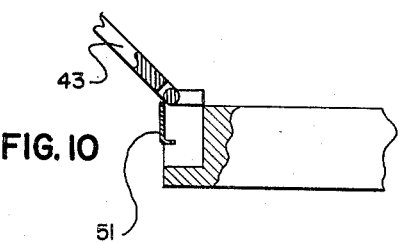

FIGS. 3, 4 and 5 are perspective views of the same cassette as is illustrated in FIG. 1, FIG. 3 showing the cassette in an improper inverted position prior to initial insertion, FIG. 4 illustrating the effect of proper initial insertion, and FIG. 5 illustrating the cassette ready for insertion in its inverted (rewind) position following proper initial insertion and exposure of the first side of the film;

FIG. 6 is a perspective view of the same cassette as illustrated in FIG. 1, illustrating the cassette following its removal from the camera after proper exposure of both sides of the film, and showing the cassette cover in open relation for removal of the exposed film and for resetting of the interlock system disclosed herein;

FIGS. 7, 8, 9 and 10 are partial cross-sections of the cassette corresponding, respectively, to FIGS. 3, 4, 5 and 6;

FIGS. 11, 12, 13, 14 and 15 are partial cross-sections of a cassette according to a second embodiment of the present invention, and illustrating progressively the operation of the cassette interlock mechanism in response to the proper initial insertion, removal, inversion and reinsertion of the cassette and FIG. 16 is a partial cross-section of the second embodiment of the cassette, illustrating an attempted improper initial insertion of the cassette into the camera.

FIG. 1 illustrates a cassette-loading camera 21 with the cover 23 of its cassette-receiving recess 25 open. Camera 21 has a picturetaking axis 27 along which is aligned the lens and shutter systems of the camera. Inside cassette receiving recess 25 are a square-headed protrusion 31, a slant-headed protrusion 33, and spindle drive clutch face 35, the latter member being designed to cooperate with the similar clutch faces of film supply spindle 37 and film take-up spindle 39 of the movie film cassette shown in FIGS. 2 and 3.

The cassette is formed by a body member 41 and a cover member 43 which are suitably attached to each other by means of hinges 45 so that the cassette may be loaded with film 47. As is well known in the art, this type of cassette is inserted into the camera initially in the position illustrated in FIG. 2 and the film is driven by a claw mechanism (not shown) from supply spindle 37 to take-up spindle 39, the latter member being driven by the camera's spindle drive 35. After one half-width of the film has been exposed but before the end of the film is pulled from the supply spool, the camera operator removes the cassette, inverts it to the position illustrated in FIG. 3, and reinserts it into the camera so that the second side of the film may be exposed, the camera's spindle driving member 35 now cooperating with the cassette film supply spindle 37 to rewind the film on the supply spindle.

Referring now specifically to the embodiment of the invention herein as illustrated in FIGS. 2 through 10, a blocking plate 51 is rotatably mounted by means of pivot 53 to the body 41 of the cassette. Blocking plate 51 has a bent down ear 55 that reaches into an elongated cavity 57 in cassette body member 41.

Figure 2:
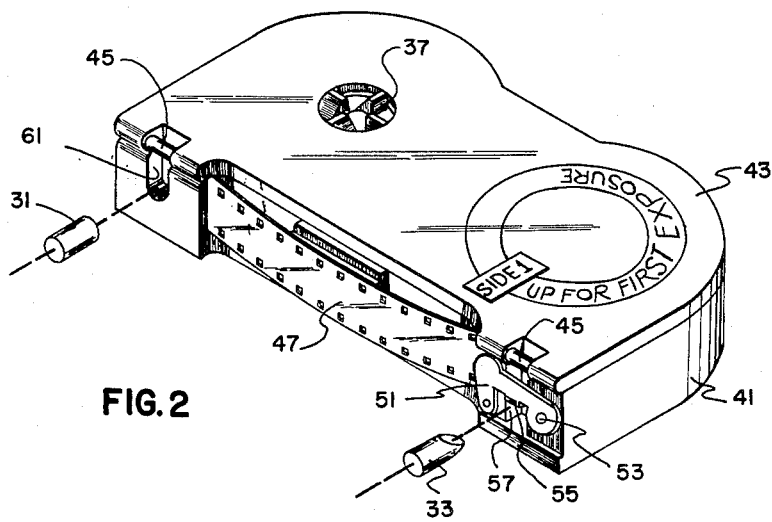
FIG. 2 is a perspective view of a cassette according to one embodiment of the invention and shown in correct position for initial insertion into the camera body.

It can be seen that if the cassette is initially inserted into cassette receiving recess 25 of camera 21 in the position illustrated in FIG. 2, square-headed protrusion 31 will fit into cavity 61 in body member 41 of the cassette, while slant-headed protrusion 33 will cooperate with the bent down ear 55 of blocking plate 51 to engage and move blocking plate 51 in a clockwise direction around its pivot 53.

However, in the event that the operator inadvertently attempts to initially insert the cassette into the camera in the position as illustrated in FIG. 3, square-headed protrusion 31 will be blocked from entering cavity 57 by blocking plate 51. Since the square-head of protrusion 31 cannot cooperate with ear 55 to rotate blocking plate 51 from its initial position, the cassette will not fit into camera recess 25. This is illustrated in cross-section in FIG. 7.

FIG. 4 illustrates the effect of the proper initial insertion of the cassette into camera 21, showing blocking plate 51 in its inoperative position following its rotation out of click-stop recess 59 by the effect of slant-headed protrusion 33 acting on ear 55. This is also shown in cross-section in FIG. 8.

Following the exposure of one half of film 47, the operator removes the cassette from the camera and then inverts the cassette to the position illustrated in FIG. 5. Since blocking plate 51 is held in the inoperative position as illustrated in FIG. 4 by the effect of its click-stop means, or by such means as a friction or spring lock, it is now possible to reinsert the cassette into the camera, because blocking plate 51 has been rotated sufficiently to permit entry of square-headed protrusion 31 into cavity 57, as can be seen in cross-section in FIG. 9.

Thus, while the operator cannot initially insert the cassette in its inverted (rewind) position due to the effect of blocking plate 51, he is able to insert it in this rewind position once the cassette has initially been inserted into the camera properly.

After the second half-width of film 47 has been exposed, the cassette is removed from the camera and opened to remove the exposed film. The opening of cover 43 of the cassette acts on blocking plate 51, in the manner illustrated in FIGS. 6 and 10, to rotate blocking plate 51 counterclockwise to its initial operative position as shown in FIGS. 2 and 3. Blocking plate 51, once returned to its operative position, is held in that position by the effect of its engagement with click-stop recess 59.

FIGS. 11 through 16 illustrate a second embodiment of the invention, with parts corresponding to similar parts of the above-described first embodiment being assigned recognizably similar reference numbers.

As can be seen from FIG. 11, the camera body is provided with a square-headed protrusion 131 and a slant-headed protrusion 133 which are designed to cooperate with two suitable cavities 157 and 161 in the body member 141 of the cassette. Cavity 157 is normally covered by blocking spring 151 which, as shown in FIG. 12, is moved out of blocking relation to cavity 157 by slant-headed protrusion 133 when the cassette is initially inserted into the camera in its proper position. A locking lug 163 is mounted on cover 143 of the cassette so that as blocking spring 151 is moved to the withdrawn position illustrated in FIG. 12, it rides over locking lug 163. Blocking spring 151 is then locked in that withdrawn position by locking lug 163. Thereafter, when the magazine is withdrawn from the camera, following the exposure of the first side of the film, blocking spring 151 remains in its withdrawn position as illustrated in FIG. 13.

When the cassette is inverted and reinserted into the camera for the exposure of the second side of the film, cavities 157 and 161 are both clear to receive protrusions 131 and 133, permitting the cassette to be inserted in its inverted (rewind) position, as shown in FIGS. 14 and 15. However, as can be seen from FIG. 16, in the event that an attempt be made to insert the cassette into the camera initially in its inverted position, square-headed protrusion 131 will be blocked by blocking spring 151, making it impossible for the cassette to be fitted into the cassette-receiving recess in this improper manner.

Following the exposure of both sides of the film, the operator removes the cassette from the camera and opens its cover member 143 so that the exposed film may be removed from the cassette for processing. When cover member 143 is opened, raising locking lug 163 out of contact with blocking spring 151, that latter member is released and returned to its initial blocking position as illustrated in FIG. 11. This resets the interlocking mechanism and assures that when the cassette is once again loaded with film it cannot be improperly inserted into the camera.

It should be understood that the specific embodiments of the present invention which have been disclosed herein have been selected to facilitate in the disclosure of the invention rather than to limit the particular form which it may assume. Further, it should be understood that various modifications, adaptations and alterations may be applied to the specific forms shown to meet the requirements of practice without in any manner departing from the spirit or scope of the present invention.

What is claimed is:

I claim:

1. A film cassette adapted to be inserted into a cassette-receiving chamber of a camera alternatively in first and second positions, comprising a casing for receiving a supply of film, a blocking member mounted on said casing to move between a normally blocking position, in which it prevents insertion of the cassette into said chamber in said second position, and an unblocking position, in which it permits insertion of said cassette into said chamber in said second position, said blocking member being movable to said unblocking position in response to insertion of said cassette into said chamber in said first position.

2. A film cassette according to claim 1 wherein said casing comprises two members movable between open and closed positions, and wherein said blocking member is moved to said blocking position whenever said casing members are opened.

3. In an apparatus of the type described, the combination of a camera having a cassette-receiving chamber; a film cassette insertable into said chamber alternatively in first and second positions; first and second interlocking means on said cassette and in said cassette-receiving chamber, respectively, cooperating when said cassette is inserted into said camera; and a blocking member mounted on said cassette to move to and from a normal blocking position with respect to said first interlocking means, and responsive to said second interlocking means when said cassette is inserted into said camera in said first position for movement from said blocking position, said cassette being insertable into said camera in said second position only when said blocking member is moved from said normal blocking position.

4. A cassette according to claim 3 wherein said cassette comprises a casing including two members movable between open and closed positions, and wherein said blocking member is moved to said blocking position when said casing members are opened to provide access to the interior of the cassette.

5. A cassette according to claim 3 wherein said first interlocking means includes spaced recesses in the outer surface of said cassette, and wherein said second interlocking means includes protrusions in the cassette-receiving chamber of said camera, and wherein said blocking member is normally positioned in covering relation with at least one of said recesses when in said blocking position.

6. In an apparatus of the type described, the combination of a camera having a cassette-receiving chamber; a film cassette insertable into said chamber in first and second positions and comprised of two hinged members movable between open and closed positions; spaced recesses in the outer wall of said cassette; protrusions in said camera chamber cooperating with said recesses when said cassette is inserted into said camera; a blocking member mounted on said cassette and movable between a normally operative position with respect to at least one of said recesses in which it prevents insertion of said cassette into said camera chamber in said second position, and an inoperative position with respect to said recesses in which it allows insertion of said cassette into said chamber in said second position, said blocking member being moved to said inoperative position in response to the insertion of said cassette into said chamber in said first position; holding means for maintaining said blocking member in the position to which it has been last moved; and restoration means for moving said blocking member to said normally operative position when said casing members are opened to provide access to the interior of said cassette.

7. A cassette according to claim 6 wherein said blocking member is a pivoted lever arm.

8. A cassette according to claim 6 wherein said blocking member is a spring biased to said normally operative position.

9. A cassette according to claim 7 wherein said holding means includes click stops comprised of suitable detents and recesses in said lever arm and said outer wall of said cassette.

10. A cassette according to claim 8 wherein said recesses are located in the outer wall of one said cassette member and said holding means and said restoration means includes a locking member attached to the other said cassette member, said locking member acting to engage the spring member to hold it in said inoperative position when said spring member is moved thereto in response to the insertion of said cassette into said camera chamber in said first position, and said locking member being disengaged from said spring member when said casing members are open permitting said spirng member to return to said normally operative position.

References Cited in the file of this patent
UNITED STATES PATENTS

| | | |
|---|---|---|
| 2,026,960 | Branch | Jan. 7, 1936 |
| 2,987,956 | Planert et al. | Apr. 19, 1957 |
| 3,120,781 | Babcock et al. | Feb. 11, 1964 |